US008550038B2

(12) United States Patent
Marlenee et al.

(10) Patent No.: US 8,550,038 B2
(45) Date of Patent: Oct. 8, 2013

(54) GENERATOR SET COOLING CONTROL SYSTEM

(75) Inventors: Alyssa Marlenee, St. Louis Park, MN (US); Arthur J. Punyko, St. Paul, MN (US); Leo T. Steffl, Minneapolis, MN (US); Michael A. Fedewa, Isanti, MN (US); Lee Midlo, Isanti, MN (US); Daniel Woody, Troy, MI (US)

(73) Assignee: Cummins Power Generation IP, Inc., Minneapolis, MN (US)

(*) Notice: Subject to any disclaimer, the term of this patent is extended or adjusted under 35 U.S.C. 154(b) by 197 days.

(21) Appl. No.: 12/924,774

(22) Filed: Oct. 5, 2010
(Under 37 CFR 1.47)

(65) Prior Publication Data

US 2011/0248511 A1    Oct. 13, 2011

Related U.S. Application Data

(60) Provisional application No. 61/248,849, filed on Oct. 5, 2009.

(51) Int. Cl.
*F01P 9/00* (2006.01)
(52) U.S. Cl.
USPC .................. 123/41.01; 290/1 A; 290/1 B
(58) Field of Classification Search
USPC .......... 123/41.01, 41.11, 41.12, 41.48, 41.49, 123/41.65; 290/1 A, 1 B
See application file for complete search history.

(56) References Cited

U.S. PATENT DOCUMENTS

| 3,527,268 | A | | 9/1970 | Ginsburgh |
| 3,828,742 | A | * | 8/1974 | Weis ............................ 123/351 |
| 5,287,831 | A | * | 2/1994 | Andersen et al. .......... 123/179.3 |
| 5,479,812 | A | | 1/1996 | Juntunen et al. |
| 5,724,941 | A | * | 3/1998 | Suzuki et al. ............ 123/339.15 |
| 5,910,099 | A | * | 6/1999 | Jordan et al. ................... 60/599 |
| 6,338,008 | B1 | | 1/2002 | Kohut et al. |
| 6,491,494 | B1 | | 12/2002 | Beckenbach et al. |
| 7,024,258 | B2 | | 4/2006 | Ahmed et al. |
| 7,640,185 | B1 | | 12/2009 | Giordano et al. |
| 2006/0191500 | A1 | * | 8/2006 | Sugiyama et al. ......... 123/41.12 |
| 2006/0276301 | A1 | * | 12/2006 | Chida et al. ..................... 477/98 |
| 2007/0038355 | A1 | * | 2/2007 | Brandt et al. ................... 701/50 |
| 2007/0181356 | A1 | * | 8/2007 | Ando et al. ................... 180/65.4 |
| 2008/0103635 | A1 | * | 5/2008 | Vuk et al. ...................... 700/300 |
| 2008/0238607 | A1 | * | 10/2008 | Schuricht et al. ............. 340/3.1 |
| 2010/0094490 | A1 | | 4/2010 | Alston et al. |

* cited by examiner

*Primary Examiner* — Noah Kamen
*Assistant Examiner* — Long T Tran
(74) *Attorney, Agent, or Firm* — Krieg DeVault LLP

(57) ABSTRACT

A system includes a genset having an engine, an AC generator, and a radiator thermally coupled to the engine. The system includes an electric variable speed fan having an outlet flow, where the outlet flow passes at least partially through the radiator. The system includes a controller structured to functionally execute certain operations for cooling the genset. The controller interprets a genset identification parameter and selects a cooling algorithm from a predetermined set of cooling algorithms according to the genset identification parameter. The controller further interprets genset operating conditions according to the cooling algorithm, and provides a cooling fan command in response to the genset operating conditions and the cooling algorithm. The electric variable speed fan is responsive to the cooling fan command.

31 Claims, 10 Drawing Sheets

720

| Genset identification parameter (712) | Fan output values, Fan 1 (724a) | Fan output values, Fan 2 (724b) | Fan output values, Fan 3 (724c) | Fan output values, Fan 4 (724d) |
|---|---|---|---|---|
| Model 1 | F1(coolant temp), F1(control box temp), MAX | F1(coolant temp), F1(control box temp), MAX | N/A | N/A |
| Model 2 | F2(coolant temp), F1(control box temp), MAX | F2(coolant temp), F1(control box temp), MAX | N/A | N/A |
| Model 3 | F3(coolant temp), F1(control box temp), MAX | F3(coolant temp), F1(control box temp), MAX | N/A | N/A |
| Model 4 | F1(coolant temp), F1(control box temp), F1(IMT), MAX | F1(coolant temp), F1(control box temp), F1(IMT), MAX | F1(coolant temp), F1(control box temp), F1(IMT), MAX | N/A |
| Model 5 | F1(coolant temp), F1(control box temp), MAX | F1(coolant temp), F1(control box temp), MAX | F2(coolant temp), F1(IMT), MAX | F1(control box temp), F2(IMT), MAX |
| Model 6 | F6(coolant temp) | F6(coolant temp) | F2(coolant temp), F1(IMT), MAX | F1(control box temp), F2(IMT), MAX |

| Control box temp | Fan output (PWM %) |
|---|---|
| 99° F | 0 |
| 100° F | 20 |

| Coolant temp | Fan output (PWM %) |
|---|---|
| -60° F | 0 |
| 198° F | 0 |
| 199° F | 0 |
| 200° F | 20 |
| 206° F | 45 |
| 208° F | 47 |
| 210° F | 49 |
| 212° F | 51 |
| 213° F | 53 |
| 215° F | 55 |
| 216° F | 57 |
| 218° F | 59 |
| 220° F | 61 |
| 222° F | 63 |
| 223° F | 65 |
| 227° F | 65 |
| 227° F | 65 |

| IMT | Fan output (PWM %) |
|---|---|
| -60° F | 0 |
| 59° F | 0 |
| 60° F | 0 |
| 70° F | 0 |
| 80° F | 20 |
| 90° F | 20 |
| 100° F | 30 |
| 110° F | 40 |
| 120° F | 50 |
| 130° F | 55 |
| 140° F | 57 |
| 150° F | 57 |
| 160° F | 57 |
| 170° F | 57 |
| 180° F | 57 |
| 190° F | 57 |
| 200° F | 57 |

Fig. 11

GENERATOR SET COOLING CONTROL SYSTEM

CROSS REFERENCE TO RELATED APPLICATIONS

The present application claims the benefit of U.S. Provisional Patent Application No. 61/248,849 filed on Oct. 5, 2009, and the same is herein incorporated by reference in its entirety.

GOVERNMENT RIGHTS

The present invention was made with U.S. Government assistance under Department of Defense contract Number W15P7T-04-D-A003. The U.S. Government has certain rights in the invention.

BACKGROUND

The present application is directed to unique apparatus, systems, and methods involving an electric power generator driven by an internal combustion engine.

A generator set (genset) typically includes an electric power generator together with an internal combustion engine structured to mechanically drive the generator to produce electricity. Genset implementation varies greatly, including both mobile and stationary applications, primary and standby/backup power, controlled and uncontrolled environments, and the like. In many applications it is desired that the genset operate outdoors, being able to tolerate environmental extremes of temperature, humidity, precipitation, and the like. Alternatively or additionally, there is often a desire to minimize noise emanating from the genset, while maintaining a sufficiently small genset form factor; improve genset efficiency, maintainability, reliability, and/or manufacturability; provide operator-friendly input/output genset interfacing; and other sought-after features. Among other challenges, the variability in genset hardware and applications introduces the need for variable cooling schemes, including the use of a number of different cooling fans in various configurations and with different control elements and speed requirements. Accordingly, there remains an ongoing need for further contributions in this area of technology.

SUMMARY

One embodiment of the present invention is a unique genset cooling control system configuration. Other embodiments include unique genset control system apparatus, systems, devices, and methods. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 8 is an illustration of a predetermined set of exemplary cooling system control algorithms.

FIG. 9 is an exemplary generator control box cooling control table.

FIG. 10 is an exemplary coolant temperature control table.

FIG. 11 is an exemplary intake manifold temperature control table.

DETAILED DESCRIPTION

Figure 1:
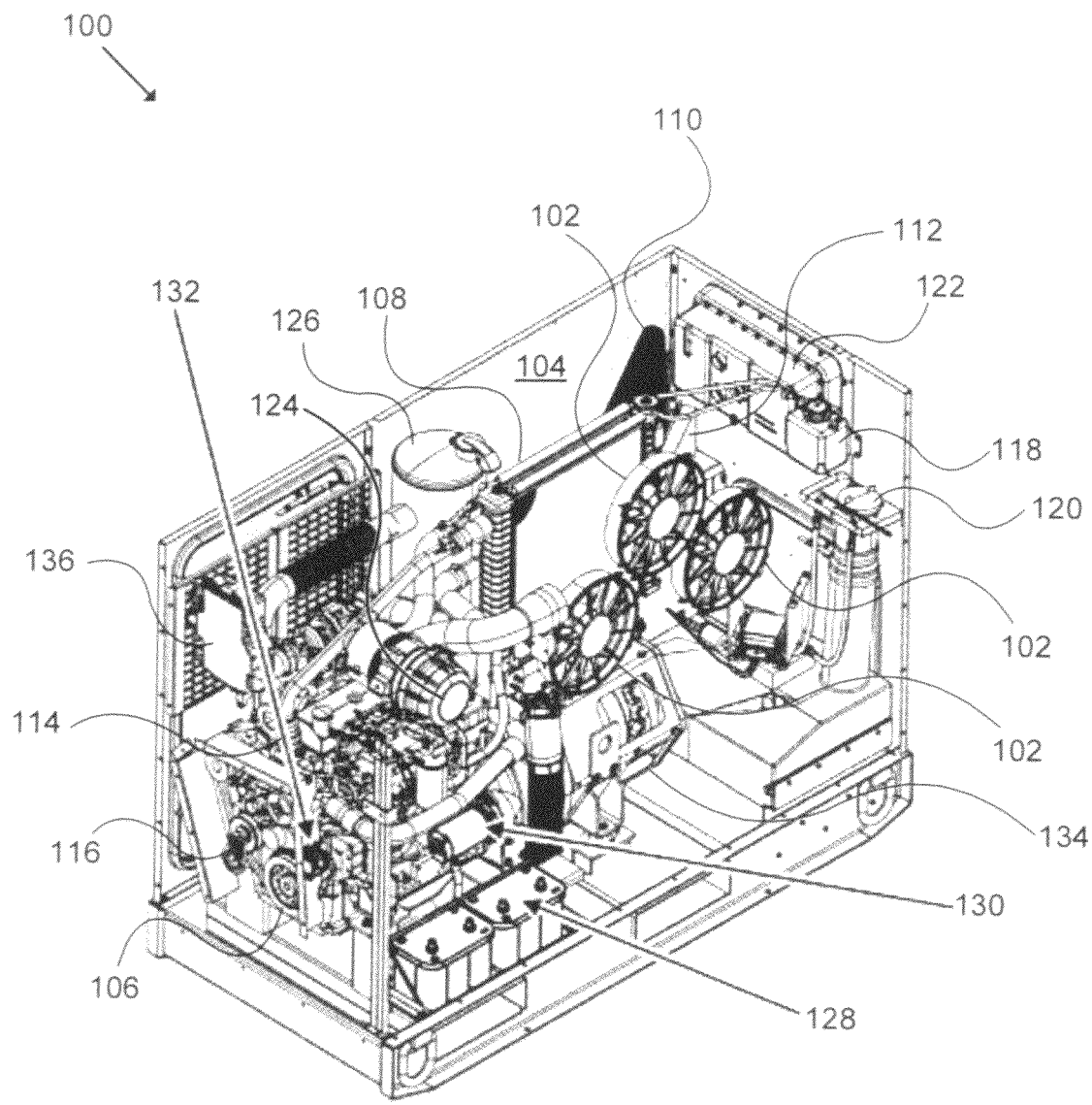
FIG. 1 is a schematic perspective diagram of a genset.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates a genset 100 in a perspective view, the genset 100 having a number of cooling fans 102. The number of fans 102 is dependent upon the cooling requirements of the genset 100, the positioning of air-cooled devices within the genset 100, the desired flow rates and fan speeds for the particular genset 100, and other considerations understood in the art. Embodiments including a single cooling fan, two cooling fans, three cooling fans, four cooling fans, or more than four cooling fans are contemplated herein.

The exemplary cooling system for the genset includes three cooling fans 102, and allows the generator set to operate in all required operational environments. The 16-in., variable-speed 24-VDC cooling fans 102 provide for a better radiator location and air flow paths for improved cooling efficiency. Intake air for the cooling system is drawn by the cooling fans through a grille on the left-side body panel 104.

The genset 100 includes a diesel engine 106 having a radiator, a charge air cooler, and a fuel cooler. The air from the cooling fans 102 passes through the cooling fins of the radiator, charge air cooler, and fuel cooler, transferring heat from the cooling system to the air flow. The warm air is then expelled into the atmosphere through a grille in the top panel (not shown). The cooling system also reduces wear on the battery-charging alternator belt and water pump. Cold weather operation is also improved by regulating cabinet temperature at or near ideal operating temperatures of 195 degrees Fahrenheit (° F.) (90.5 degrees Celsius (° C.)).

The coolant circulation system includes: the radiator 108, a charge air cooler 110, a fuel cooler 112, a thermostat 114, a water pump 116, a winterization kit (behind the engine 106, not shown), and coolant overflow reservoir 118. The coolant circulation system is responsible for keeping the engine 106 below an undesirably high temperature. The coolant overflow reservoir 118 is mounted to the rear panel near the fuel fill 120 opening, where the coolant overflow bottle is visible for inspection of coolant level. Access for coolant filling is provided through the top panel (not shown). The radiator 108 acts as a heat exchanger for the engine coolant. A radiator fill port is accessible on the top body panel. The radiator 108 includes a captive radiator cap that prevents loss of coolant. The charge air cooler 110 dissipates the heat from the compressed air exiting the turbocharger into the air flow. The cooling of the intake air improves the efficiency of the engine 106. The fuel cooler 112 is located behind the charge air cooler 110. The fuel cooler 112 is not visible unless the top panel is removed. Cooling of the fuel prior to injection into the engine can improve efficiency of the engine. A thermostat 114 is located inside the housing where the upper radiator connects to the top of the engine 106. The thermostat 114 monitors coolant temperature and adjusts the cooling system accordingly. The water pump 116 circulates the coolant through the engine block and the radiator 108.

To facilitate proper operation under extreme cold conditions, the winterization kit includes a fuel-fired coolant heater that heats coolant in extreme cold conditions, such as between −25° F. and −50° F. (−32° C. and −46° C.) by utilizing the fuel from the generator set. The winterization kit automatically activates, depending on the temperature, and features automatic heat regulation. The genset 100 includes a digital control system (DCS) 122. The DCS 122 provides a [READY TO CRANK] indicator on a user display panel when the heater has completed the coolant heating cycle. An air cleaner assembly 124 mounted on a bracket attached to the front and top panels, filters contaminates from the air intake. The air cleaner assembly 124 contains an integrated, centrifugal pre-cleaner that removes most dust particles prior to entering the air cleaner element, extends filter life, reduces maintenance costs, and reduces downtime.

The engine exhaust system includes an exhaust manifold (backside, not visible). As exhaust leaves the compression chamber of the engine 106, the exhaust is routed through the exhaust manifold into a single pipe, and then through the turbocharger. The turbocharger uses exhaust gases to turn a turbine which compresses the intake air. The compressed intake air is directed to the cylinders through the intake manifold and improves the efficiency and power production of the engine. The exhaust gases exit the turbocharger and through a muffler 126. The bulkhead-mounted muffler 126 silences the exhaust pulses from the engine 106 and expels exhaust gases through the top body panel grille.

The genset 24-VDC electrical system uses two 12-V batteries 128 connected in series, that are of standard commercial size and located side-by-side on the left side of the genset 100. The batteries are accessed through the left-side door (not shown). In one implementation, the batteries are capable of starting the engine of the genset 100 under all conditions between −50° F. (−46° C.) and 135° F. (57° C.) ambient temperatures. The genset 100 may include a standard belt-driven alternator 130 to charge the batteries 128. The starter 130 is located on the left side of the engine above the oil pan. A NATO-compliant slave receptacle 132 is provided should the unit require jump-starting from another 24 VDC source. In the event the engine needs to be manually turned, a three-position DEAD CRANK SWITCH is included. If the temperature is between 20° F. and −25° F. (−6° C. and −32° C.), intake air heaters (not shown) are used to aid in starting. For temperatures between −25° F. and −50° F. (−32° C. and −46° C.) the optional winterization kit (FIG. 7, Item 6) is used as an engine starting aid.

The AC generator 134 converts the rotating mechanical energy from the engine 106 into electrical energy. The electrical energy is then distributed from the output box assembly through cables that enter the output box assembly. In certain implementations, the AC generator 134 is a Cummins Power Generation CPG UC224D (Mode I, Model 1070 (50/60 Hz)) or a Marathon 30 kW (Mode II, Model 1071 (400 Hz)). The AC generator 134 has a synchronous, brushless design with a permanent magnet and was developed specifically to meet performance requirements. The AC generator 134 receives mechanical energy from the engine and converts it to electrical energy. The electricity produced by the AC generator 134 is transmitted to the output terminal board.

The AC generator 134 and voltage control system are of a drip-proof, guarded machine type and are synchronous and brushless, as specified in National Electrical Manufacturers Association (NEMA) Standard No. MG, part 33; the bearings are sealed and permanently lubricated; the AC electric power generation system leads are identified with permanent marker; and/or such leads are brought out of the frame through non-abrasive bushings and holders in the output terminal board to isolate each lead and hold it securely in place.

The embodiment of FIG. 1 is directed to a genset 100 with a 30 kW rating under the Advanced Medium Module Power Sources (AMMPS) program of the U.S. Department of Defense. Under this program various implementations provide nominal AC output frequencies selectable between 50 and 60 Hertz (Hz), while others provide a nominal AC output frequency of 400 Hz; and may be configured to provide nominal output voltages selectable between 120 and 240 VAC nominal, while others include 416 VAC nominal. Nonetheless, still other embodiments may be configured to provide different output voltage(s), frequencies, and maximum peak, sustained, or rated output power levels, in addition to or in lieu of those explicitly described. For instance, such other embodiments can have power ratings of 5 kW, 10 kW, 15 kW, and 60 kW—to name just a few examples. Furthermore, while the genset of FIG. 1 includes features to accommodate certain military battlefield conditions, extreme cold starting, and the like; in other embodiments some or all of such features may be absent and/or any of such features may be directed/desired for nonmilitary applications, those with other environmental considerations, or the like. Indeed, only one of the various described genset features or aspects may be included in other embodiments, and/or only one of many of the inventive features described herein may be the subject of a given invention written description or claim.

Figure 2:
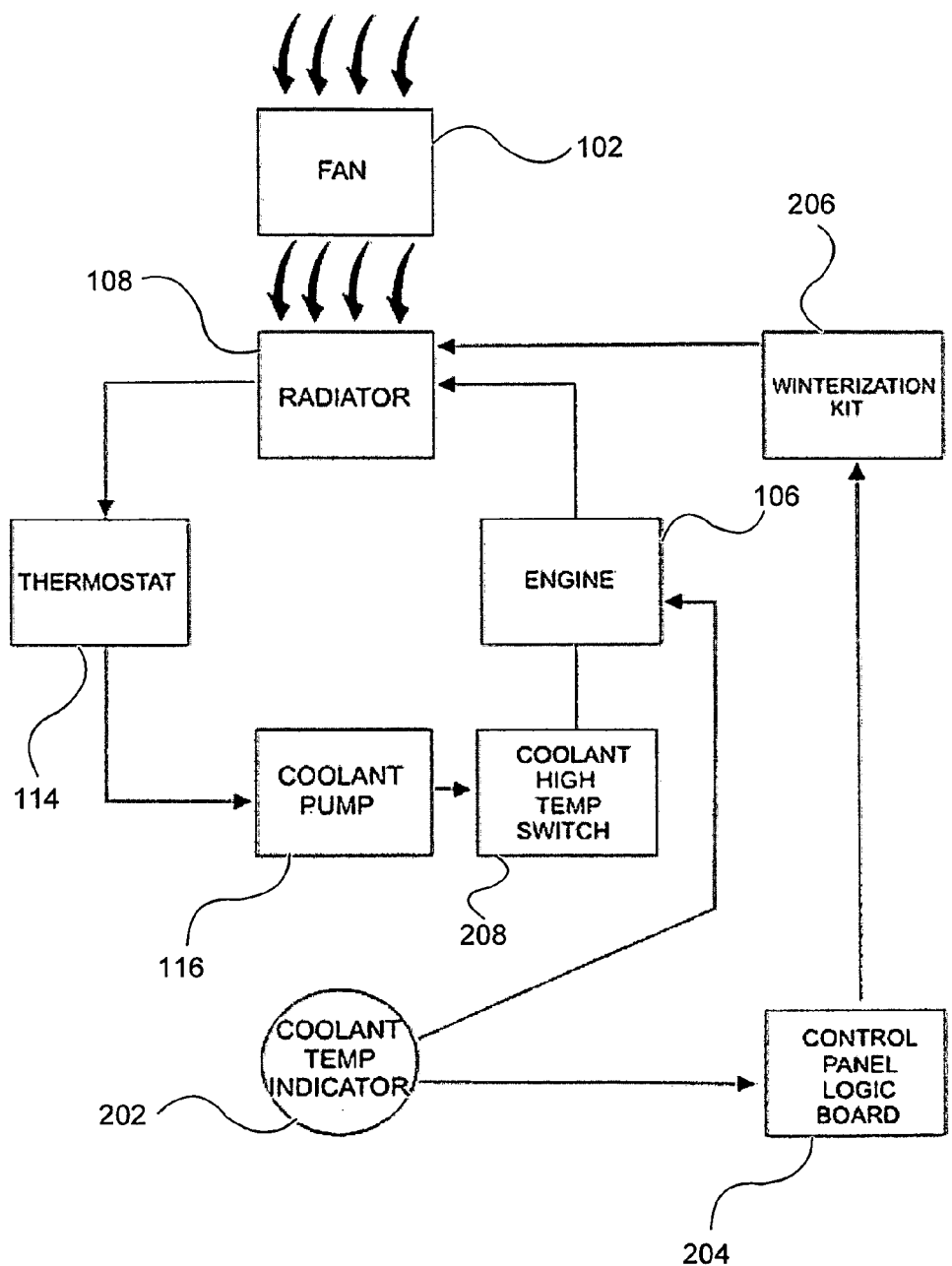
FIG. 2 is a schematic diagram of an engine cooling control system for a genset.

Next certain further features, aspects, and embodiments of the present application are described—at least some of which may pertain to a particular genset assembly, subsystem, component, display, routine, or other aspect or feature thereof. For example, an engine cooling system 200 is schematically depicted in FIG. 2. The engine cooling system 200 or this genset includes a radiator 108, hoses, thermostat 114, water (coolant) pump 116, electric fan 102, temperature sensor 202, and cooling jackets. The water pump 116 forces coolant through passages (cooling jackets) in the engine block and cylinder head where the coolant absorbs heat from the engine. When the engine reaches normal operating temperature, the thermostat 114 opens and the heated coolant flows through the upper radiator hose assembly into the radiator 108. Air circulates through the radiator 108, reducing coolant temperature.

A coolant high-temperature logic control, provided on a control panel logic board 204, provides automatic shutdown in the event that coolant temperature exceeds 225±5° F. (107±3° C.). In one example, the control panel logic board 204 operates a coolant high temp switch 208 to provide the automatic shutdown. The control panel logic board 204 may be located on the DCS 122, may be included on an engine controller 136 (reference FIG. 1), may be a standalone controller, or may be a distributed among one or more devices. A COOLANT TEMP indicator on the DCS 122 displays coolant temperature range from 100° F. to 260° F. (38° C. to 127° C.).

Cold outside temperatures make starting the engine difficult. To improve engine starting, a cold weather starting system has been provided featuring two starting aids, standard air intake heaters mounted in the intake manifold, and an optional winterization kit 206. The air intake heaters warm the air in the combustion chamber to assist with ignition when the ambient air temperature is below +20° F. (−6° C.). The winterization kit 206 warms the engine coolant and thus the engine block when the ambient air temperature is between −25° F. (−32° C.) and −50° F. (−45.56° C.).

In most generator sets the cooling system air is provided by an engine-driven fan, and air flows in one end of the generator set and out the other end. Among the limitations of a typical generator set air flow path may be: all of the air entering the generator set flows over the hot engine, resulting in hot air reaching the radiator that provides poor cooling performance; because cooling air is warmed by the engine and generator, a higher volume of air is required for the radiator, which results in increased pressure drop (which requires more fan power) and larger inlets and outlets (which increases noise); and/or high velocity air moving past the engine during very cold temperature operation at light load will severely over-cool the engine, which can be a contributor to wet stacking as well as fuel flow problems.

Among the innovative aspects of the present application is an alternative that uses electric variable speed cooling fan(s) and/or unique internal structures to form/guide various airflows therethrough. In one example, there is one air inlet to the housing and a single cooling fan with one air outlet. This arrangement may be used, for example, in a 5 kW rated form of AMMPS. Internal to the genset housing, the air draw therein by the fan is separated into two different air flow paths. One path removes heat from the radiator, and the other path removes heat from the generator and the engine compartment. The variable speed fan provides increased efficiency and fan noise at light loads. The electric operation of the fan provides mounting flexibility to position the fan anywhere on the genset rather than in a position defined by belt routing to the engine. The variable speed fan also improves wet stacking performance, especially at light loads and cold ambient environments.

In other embodiments, more than one variable-speed fan may be utilized to provide the desired air flow(s), and for such multiple fan embodiments, all or only some may be of a variable-speed type. For instance, the 30 kW genset described in connection with FIG. 1 includes three variable speed fans arranged to define the air intake.

At low temperatures, the variable speed fans do not run until the engine is at recommended operating temperature, and then operate at a rate which ensures desired engine performance. This approach reduces problems such as freezing crankcase ventilation lines and results in increased combustion temperature and improved wet stacking performance.

Ice, freezing rain, and hoarfrost can cause numerous problems for a generator set. Air intakes can become blocked with ice, limiting air flow, and moving parts such as louvers or exhaust caps can become stuck and freezing water inside the generator set can cause damage to components. In certain embodiments, the air flow through the radiator is isolated from the air flow through the engine compartment. The design of air flow paths eliminates the ingestion of significant amounts of water into the generator set housing. Further, the variable speed electric fans 102 run only very slowly during cool ambient temperature operation when low flow provides sufficient cooling even at full load.

In most generator set applications the cooling fan is mounted to the engine and runs at relatively low efficiency with resultant high noise. Fan efficiency is low for several reasons, such as: air inlet to the fan is blocked by the engine resulting in high pressure drops; fans are required to be small because of packaging constraints so fan speed is high. Higher tip speed results in higher noise; fan/shroud clearances are large because the fan and the shroud are on opposite sides of the engine mounting system, which result in air leakage and low efficiency of the fan; all cooling air flows through the radiator and engine compartment resulting in high air volume and high pressure drop that, in turn increases the need for higher fan power and attendant noise.

In certain embodiments of the present application, sound/noise is reduced (the acoustic signature) by: keeping the sound inside the housing with separate flow paths for the radiator and engine compartment that decrease the size of inlet and outlet ducts (which are the most significant sources of sound from the housing); using all electric high efficiency fans with low sound signature (77 dba at 1 meter) such that fan noise is reduced to levels that do not require further silencing; having only a portion of the total air flow though the engine compartment, such there is room for sound attenuating ducts at the entrance and exits of the compartment in contrast to all the cooling air moved through the engine compartment, with the result that the ducts would be unreasonably large in size to provide sufficient attenuation; and/or using large-sized air cleaners and locating them inside the housing.

The cooling system controls the fan speed using several different inputs depending on the generator set system. Inputs include coolant top tank temperature, Charge Air Cooler (CAC) air temperature and fuel return temperature. The control uses proportional control to maintain the temperature of each input to the specified temperature range. For example, the top tank temperature range is (95° C. to 100° C.). At temperature below 95° C. the fan does not run. As top tank temperature raises from 95° C. to 100° C. the speed of the fan increases with top tank temperature. At a top tank temperature above 100° C., the fan runs at 100% of rated speed. Under most steady state operating conditions, the cooling system operates at a near steady state condition within the prescribed range (95° C. to 100° C.). Because the system is closed loop around the top tank temperature (or CAC or fuel temperature) the system will automatically correct for a clogged radiator or other performance degradation.

Still other aspects included in certain embodiments include an operator interface and Display with Maintenance Reminders/Alerts and/or USB Data Logging/Storage. This display interface automatically prompts generator set operators to perform periodic/scheduled maintenance items and allows them to annotate their maintenance actions without the use of a computer keyboard or special computer software—in particular, these capabilities are provided via a small operator panel display mounted on the generator set. In addition this system provides multiple options for maintenance actions including: Complete, Defer, Dismiss. This system also detects engine/model type and automatically configures maintenance items and maintenance intervals unique to each of 10 models. This system also allows the user to navigate through all active maintenance items from the operator panel display. This system also provides a generator warning fault on the generator-set mounted display to alert the user that he/she has an active maintenance item that requires their attention. This system also automatically generates a maintenance log file entry for each active maintenance item; each entry includes a time/date stamp and generator set operating parameters (voltage, current, power, engine hours, engine protection data, cooling fan status, cold-weather starting aids status, ambient temperature, and other parameters needed for diagnostic purposes); this non-volatile log data is available via a USB port and is a comma-separated variable (CSV) file format.

Figure 3:
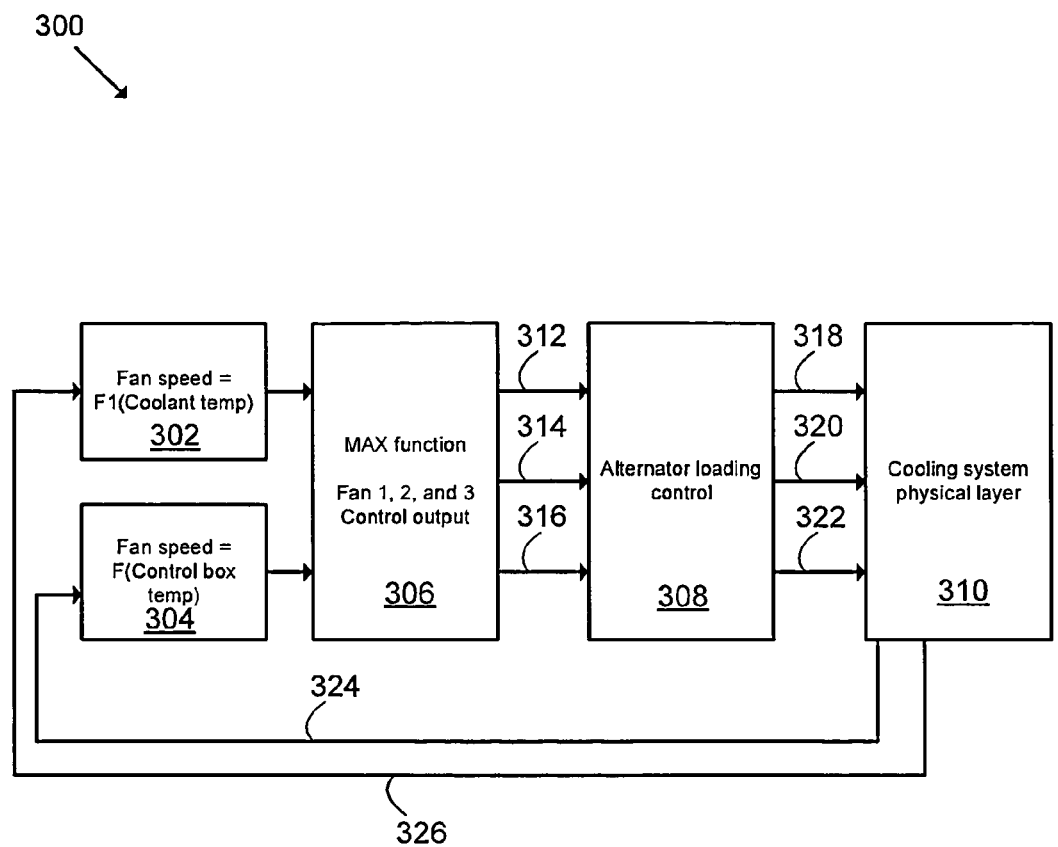
FIG. 3 is a schematic diagram of a first genset cooling control system.

Referencing FIG. 3, a schematic diagram of a first genset cooling control system 300 is illustrated. The system 300 includes a first function 302 of a fan speed output in response to a coolant temperature 324, and a second function 304 of a fan speed output in response to a control box temperature 326. The coolant temperature 324 is a temperature of the coolant for the engine determined at any point in the genset, including at the engine, thermostat, radiator, or other position known in the art. The control box temperature 326 is a temperature of the controller (e.g. the DCS 122), a temperature of another controller housing at least a portion of components for controlling the cooling control system 300, an enclosure or housing for the controller, or other control box related temperature in the genset. The system 300 further includes a MAX function 306 that selects a maximum fan speed output from the functions 302, 304. The utilization of a MAX function 306 is exemplary, and any other selection scheme to determine a single fan output value based upon multiple fan input values is contemplated herein, including various schemes to prioritize, average, or otherwise process the input values.

The system 300 provides three fan commands 312, 314, 316, but the number of fans on the genset may be any number of fans. The system 300 includes providing the fan commands 312, 314, 316 to an alternator loading control 308 function that provides adjusted fan commands 318, 320, 322 to reduce loading on the engine battery charging alternator system. An exemplary alternator loading control 308 function includes ramping up the fan commands 312, 314, 316 one at a time, where only one fan command 312, 314, 316 is allowed to increase during a fan increase speed time window. The exemplary alternator loading control 308 function ramps up each fan sequentially until the targeted fan output values from the MAX function 306 are achieved. A further embodiment of the exemplary alternator loading control 308 function similarly schedules fan commands 312, 314, 316 when the fan commands 312, 314, 316 are being reduced, allowing only one fan command 312, 314, 316 to decrease during a fan decrease speed time window. The exemplary alternator loading control 308 function further includes allowing all fan commands 312, 314, 316 to reduce to zero immediately upon a system shutdown request or fan shutdown request. The cooling system physical layer 310 includes the fans responsive to the adjusted fan commands 318, 320, 322, and temperature sensors or other temperature determination devices to provide the coolant temperature 326 and the control box temperature 324.

The selection of appropriate values for the fan increase speed time window and fan decrease speed time window depends upon system parameters that are known to one of skill in the art contemplating a particular system and having the benefit of the disclosures herein. Among the parameters that are to be considered include the capacity of the alternator system, the current load on the alternator system, the capacity and state of charge of the batteries for the genset, any capacitance in the system on the circuit including the cooling fans and the alternator system, and the magnitude of the power increase or decrease of the fan commands 312, 314, 316 relative to a current operating condition of the fans. Exemplary systems include values for the fan increase speed time window and fan decrease speed time window that are between a few tenths of a second and several seconds, although any value, based on the system parameters described, is contemplated herein.

Figure 4:
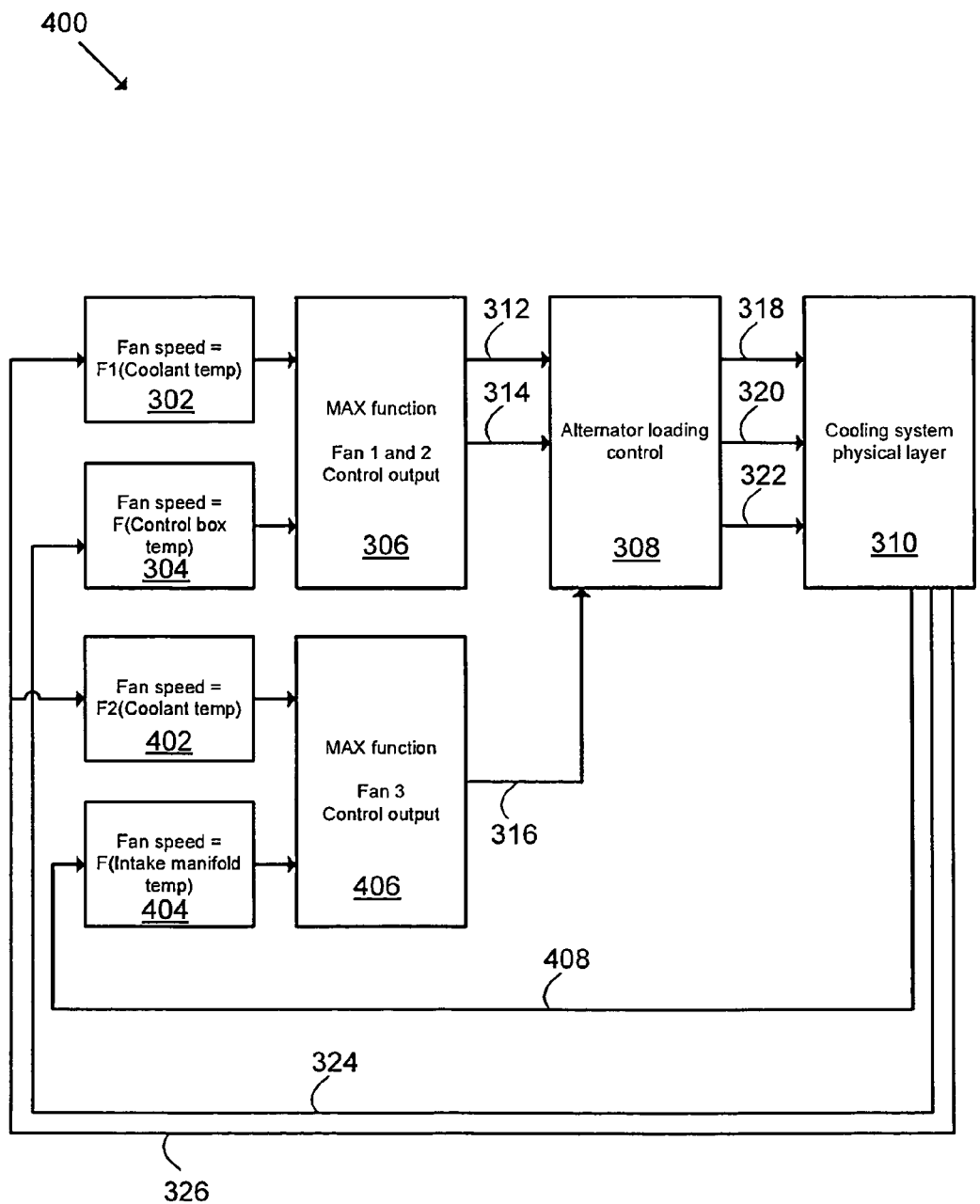
FIG. 4 is a schematic diagram of a second genset cooling control system.

FIG. 4 is a schematic diagram of a second genset cooling control system 400. In addition to the operations described in the first genset cooling control system 300, the system 400 operates the third fan from a second function 402 of the coolant temperature 326, and from a function 404 of intake manifold temperature 408. The system 400 includes a second MAX function 406 to determine the third fan command 316, and the alternator loading control 308 function performs similarly to the description referencing FIG. 3.

Figure 5:
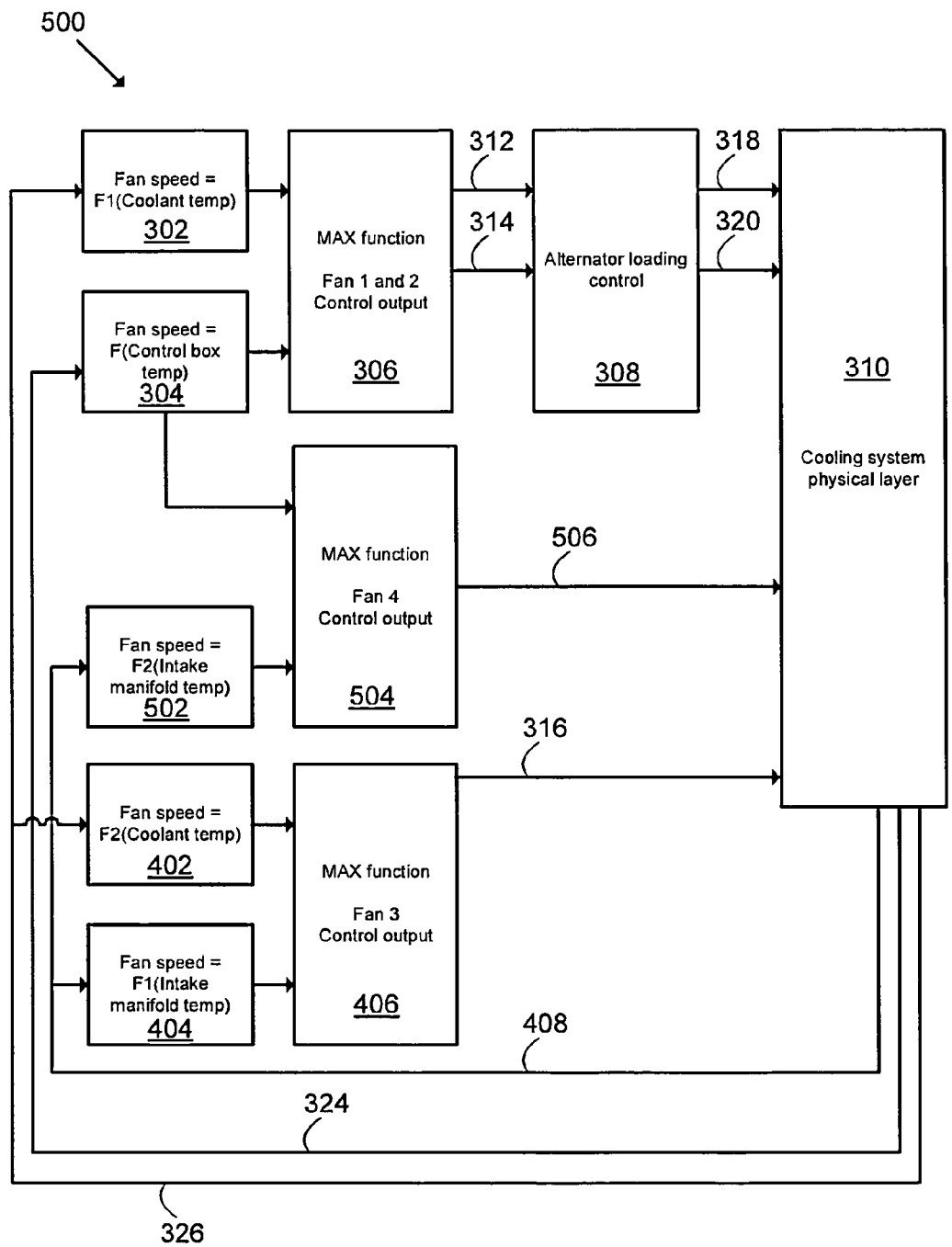
FIG. 5 is a schematic diagram of a third genset cooling control system.

FIG. 5 is a schematic diagram of a third genset cooling control system 500. The system 500 includes the third fan command 316 bypassing the alternator loading control 308 and passing directly to the cooling system physical layer 310. Additionally, the system 500 includes a fourth fan command 506 determined from a second function 502 of the intake manifold temperature 408 and from the function 304 of the control box temperature 324. The fourth fan command 506 passes directly to the cooling system physical layer 310. Any number of the fan commands 312, 314, 506, 316 may be passed to the alternator loading control 308 or directly to the cooling system physical layer 310. Additionally, any of the described functions 302, 304, 502, 402, 404, or any other functions based on temperatures within the system 500 may be utilized to generate the fan commands 312, 314, 506, 316. In certain embodiments, the selected functions utilized to determine a specific fan command are determined from which system temperatures are directly or indirectly affected by the corresponding variable speed fan that is controlled by the specific fan command. For example, in the system 500 of FIG. 5, the fourth fan controlled by the fan command 506 has a direct or indirect effect on the intake manifold temperature 408 and the control box temperature 324.

Figure 6:
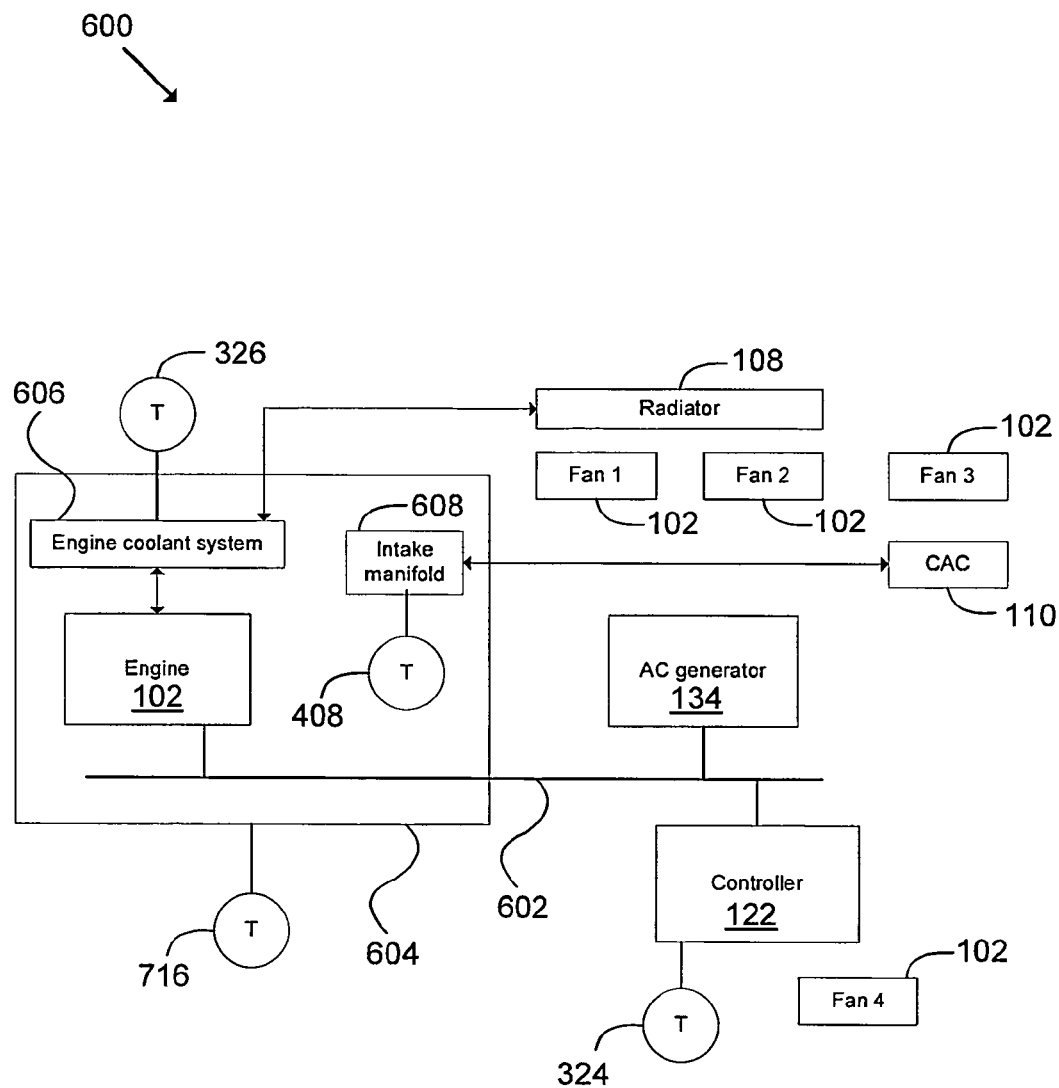
FIG. 6 is a schematic diagram of a system for cooling a genset.

Referencing FIG. 6, a schematic diagram of a system 600 for cooling a genset is illustrated. The system 600 includes a genset having an engine 102, an AC generator 134, and a radiator 108. The radiator 108 is thermally coupled to the engine 102. The genset further includes one or more electric variable speed fans 102 each an outlet flow. At least a portion of the outlet flow of one of the fans 102 passes through the radiator.

The system 600 further includes a controller 122 having a number of modules structured to functionally execute certain operations for cooling the genset. The exemplary controller includes a genset identification module, a cooling fan logic module, an operation conditions module, a cooling fan command module, and an alternator loading module. The genset identification module interprets a genset identification parameter, and the cooling fan logic module selects a cooling algorithm from a predetermined set of cooling algorithms in response to the genset identification parameter. The operation conditions module interprets a genset operating condition(s) in response to the selected cooling algorithm. The cooling fan command module provides a cooling fan command (or commands) in response to the selected cooling algorithm and to the genset operating condition(s). The electric variable speed fans 102 are responsive to the cooling fan command(s). Specific operations of an exemplary controller 122 are described in the section referencing FIG. 7.

The exemplary system 600 further includes an engine coolant system 606 and a coolant temperature 326 sensor. The system 600 further includes a control box temperature 324 sensor, and intake manifold temperature 408 sensor, and/or a genset compartment temperature 716 sensor. The genset compartment 604 may be any compartment within the genset where it is desired to control one of the fans 102 in response to the compartment temperature. The genset compartment 604 in the system 600 is the engine compartment. A system 600 may include any or all of the indicated sensors, and the location of the sensors may be in any location understood in the art. Each sensor may be include a physical sensor electrically connected to the controller 122, a temperature value communicated to the controller over a datalink, and/or a temperature determined from other parameters in the system 600 that can be used to model or estimate the coolant temperature 326.

The system 600 further includes a charge air cooler 110 that is thermally coupled to the intake manifold 608, as the charge air cooler 110 cools the compressed intake gases exiting a turbocharger of the engine 102. The arrangement of the fans 102 and sensors in the system 600 is exemplary and non-limiting.

The system 600 further includes a genset harness 602. The genset harness 602 is an electronic backbone for at least some of the electrical connections of the engine 102 and the AC generator 134 in the genset. An exemplary genset harness 602 includes a datalink wherein devices may communicate by publishing, reading, or requesting data parameters. The datalink in the genset harness 602 may be a public, private, or mixed datalink as understood in the art. An exemplary controller 122 determines a genset identification parameter in response to the controller 122 interfacing with the genset harness 602. An exemplary embodiment includes the controller 122 periodically determining the genset identification parameter, including at controller 122 power-up, or at any other time desired. In certain embodiments, the controller 122 determines the genset identification parameter only once, and will not determine another genset identification parameter unless a user instruction or service tool resets the controller 122 or instructs the controller 122 to reset the genset identification parameter. In certain embodiments, the controller 122 determines the genset identification parameter at power-up, or periodically even during run-time operations of the controller 122. The controller 122 determines the genset identification parameter according to a communicated model number from the genset, or according to a communicated power rating and/or frequency rating of the genset. In certain embodiments, the controller 122 determines the genset identification according to a hardware key on the genset harness, for example where certain pins provide an electrical response, or where tabs on the genset harness depress detectable switches on the controller 122 connector to provide the genset identification parameter. Alternatively or additionally, the genset identification parameter is provided to the controller 122 as a user input or service tool input. Any other means known in the art of providing a genset identification parameter to the controller 122 is contemplated herein.

Figure 7:
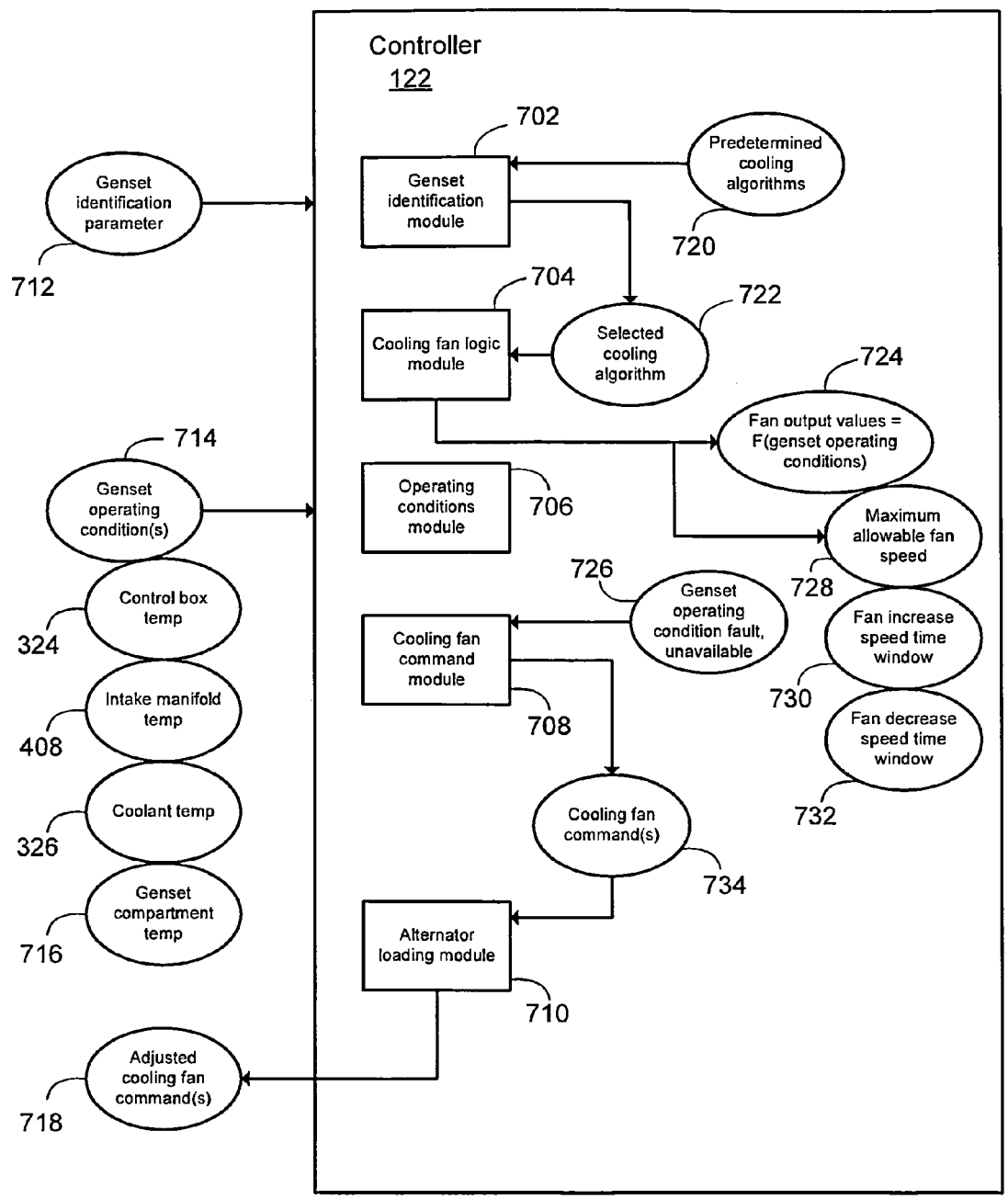
FIG. 7 is a schematic diagram of an exemplary apparatus for operating a genset cooling control system.

FIG. 7 is a schematic diagram of an exemplary apparatus 700 for operating a genset cooling control system. The apparatus 700 includes a controller 122, which may be a portion of the DCS 122, a standalone controller, or a distributed device with computing portions in various places in a genset system. In certain embodiments, the controller 122 forms a portion of a processing subsystem including one or more computing devices having memory, processing, and communication hardware. The controller 122 may be a single device or a distributed device, and the functions of the controller may be performed by hardware or software.

In certain embodiments, the controller 122 includes one or more modules structured to functionally execute the operations of the controller 122. The description herein including modules emphasizes the structural independence of the aspects of the controller 122, and illustrates one grouping of operations and responsibilities of the controller 122. Other groupings that execute similar overall operations are understood within the scope of the present application. Modules may be implemented in hardware and/or software on computer readable medium, and modules may be distributed across various hardware or software components.

The controller 122 includes a genset identification module 702 that interprets a genset identification parameter 712. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value. Exemplary genset identification parameters 712 include a model number identifying a genset, a genset power rating, and/or a genset frequency rating.

The controller 122 further includes a cooling fan logic module 704 that selects a cooling algorithm 722 from a predetermined set of cooling algorithms 720 in response to the genset identification parameter 712.

The controller 122 further includes an operation conditions module 706 that interprets a genset operating condition(s) 714 in response to the selected cooling algorithm 722. The operating conditions module 706 interprets the genset operating conditions 714 required to use the lookup tables or functions provided in the selected cooling algorithm 722. In certain embodiments, the genset operating conditions 714 include a control box temperature 324, an intake manifold temperature 408, a coolant temperature 326, and/or a genset compartment temp 716.

The controller 122 further includes a cooling fan command module 708 that provides cooling fan command(s) 734 in response to the selected cooling algorithm 722 and to the genset operating condition(s) 714. The electric variable speed fans are responsive to the cooling fan command(s) 734. In certain embodiments, one or more cooling fan commands 734 may be operated from identical logic in the selected cooling algorithm 722, resulting in the one or more cooling fan commands 734 providing equivalent output values at all operating conditions. For example, the one or more cooling fan commands 734 may be responsive to the same temperature values in the system 600. Additionally or alternatively, two or more electric variable speed fans may be operated from one of the cooling fan commands 734, resulting in the two or more electric variable speed fans operating at the same speeds or power input values at all operating conditions.

In certain embodiments, the controller includes 122 an alternator loading module 710 that adjusts the cooling fan commands 734 such that only one of the variable speed fans experiences a fan speed increase within a predetermined fan increase speed time window 730, and/or such that only one of the variable speed fans experiences a fan speed decrease within a predetermined fan decrease speed time window 732. The alternator loading module 710 provides the adjusted cooling fan command(s) 718, and the variable speed fan(s) are responsive to the adjusted cooling fan command(s) 718.

In certain embodiments, the predetermined set of cooling algorithms 720 includes a number of genset identification parameter values, each of the genset identification parameter values corresponding to lookup table(s), where each lookup table includes a cooling fan output value as a function of a genset operating condition. Referencing FIG. 8, a predetermined set of cooling algorithms 720 is illustrated including a number of genset identification parameter values 712. The predetermined set of cooling algorithms 720 further includes lookup tables corresponding to each of the genset identification parameter values 712. For example, where the genset identification parameter value 712 is "Model 6", the selected cooling algorithm 722 includes the lookup table "F6(coolant temp)" associated with the fan output values 724*a* for Fan 1, the lookup table "F6(coolant temp)" associated with the fan output values 724*b* for Fan 2, the lookup tables "F2(coolant temp)" and "F2(Intake manifold temperature)" with an instruction to utilize the MAX of the two tables for the fan output values 724*c* for Fan 3, and the lookup tables "F1 (control box temp)" and "F2(intake manifold temperature)" with an instruction to utilize the MAX of the two tables for the fan output values 724*d* for Fan 4. Where a lookup table is described herein, functions, equations, models, or other means of associating desired fan output values 724 in response to genset operating conditions are also contemplated. In the illustration of FIG. 8, "F2(coolant temp)" references a lookup table having a fan output value as a second function of coolant temperature, where "F1(coolant temp)" references a lookup table having a fan output value as a first function of coolant temperature.

In certain embodiments, the cooling algorithm 720 further includes a maximum allowable fan speed 728 for one or more of the fans. An exemplary maximum allowable fan speed is determined according to an audible noise limit for the genset. Alternatively, the maximum allowable fan speed 728 is determined separately from the cooling algorithm 720, determined as the maximum values according to the lookup tables in the selected cooling algorithm 722, and/or a default maximum allowable fan speed 728 is utilized. In certain embodiments, the cooling algorithm 720 further includes the fan increase speed time window 730 and/or the fan decrease speed time window 732. The cooling fan command module 708 commands provides the cooling fan command(s) 734 as the maximum allowable fan speed 728 in response to a genset operating condition 714 being unavailable and/or in a fault condition. The cooling fan command module 708 provides the maximum allowable fan speed 728 for any fans where the associated lookup tables have information that is unavailable or faulted, but provides the normal commanded fan speed for any fans where the associated lookup tables still have all information available.

Referencing FIG. 9, an illustrative lookup table 900 including a fan output value as a function of a genset operating condition is shown. The genset operating condition is the controller box temperature, and the fan output value is provided as a pulse-width modulated duty cycle percentage value. Any fan output value understood in the art is contemplated herein, including at least a fan speed, a fan flow rate, a percentage of fan speed or fan flow rate, and as illustrated in FIG. 9 a percentage of a maximum available voltage provided by a solid state voltage provider to the fan. In the illustration of FIG. 9, when the control box temperature is below 99° F. the associated fan is off or at a lowest output level, and when the control box temperature is above 100° F., the associated fan is on with a 20% PWM command.

Referencing FIG. 10, an illustrative lookup table 1000 including a fan output value as a function of a genset operating condition is shown. The genset operating condition is the coolant temperature, and the fan output value is provided as a pulse-width modulated duty cycle percentage value. The lookup table 1000 includes 17 points, but any number of points may be included according to desired control break points and available memory on the controller 122. Temperatures occurring between lookup table 1000 break points may be interpolated, or one of the closest values (typically the higher fan output value) may be utilized. Values beyond the table may be extrapolated or capped. Other lookup table operations understood in the art are understood to be contemplated herein. Referencing FIG. 11, an illustrative lookup table 1100 including a fan output value as a function of a genset operating condition is shown. The genset operating condition is the intake manifold temperature, and the fan output value is provided as a pulse-width modulated duty cycle percentage value.

Figure 12:
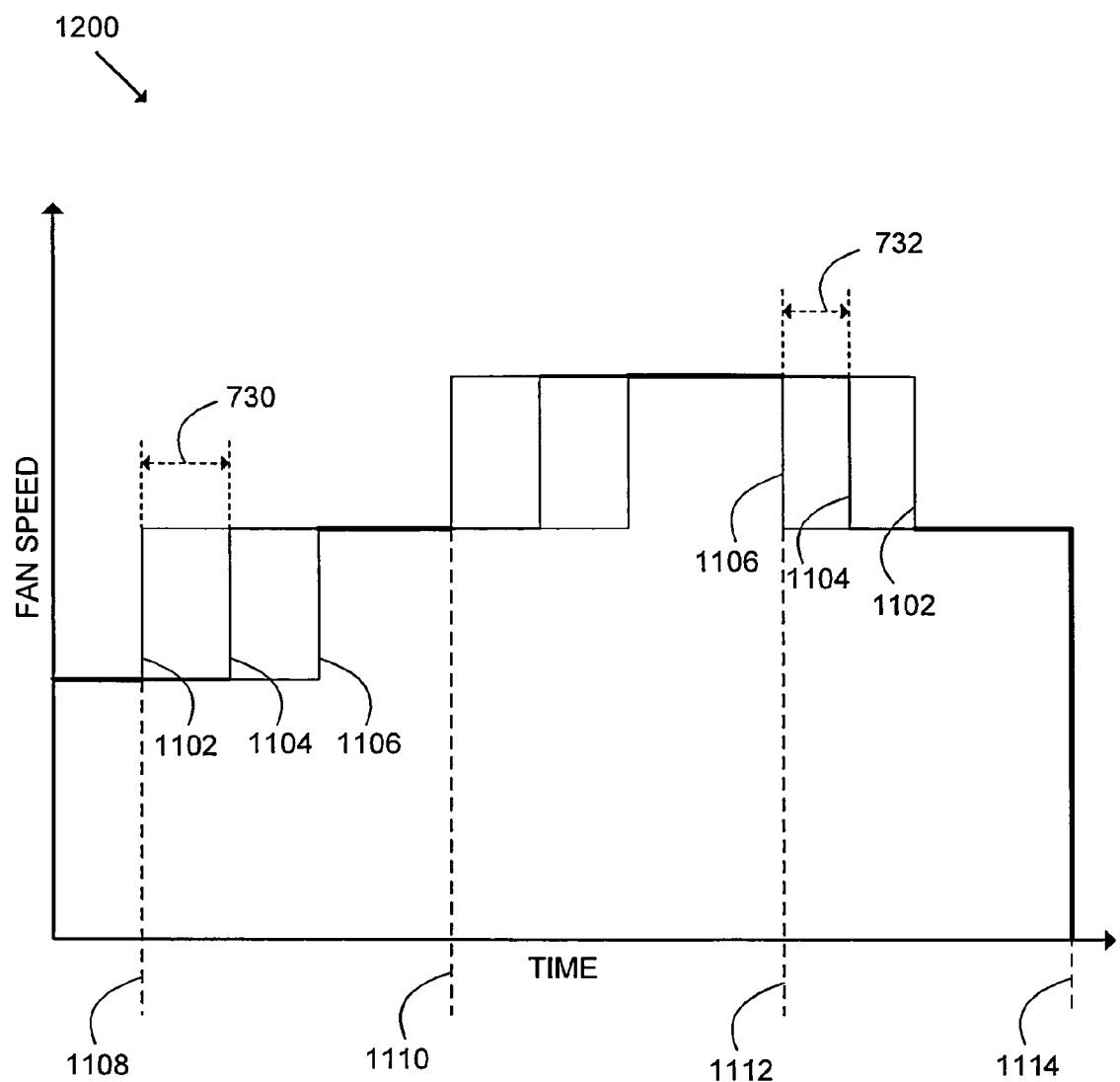
FIG. 12 is an illustration of a fan ramping logic.

FIG. 12 is an illustration of a fan ramping logic 1200. The fan ramping logic 1200 is commanded by the alternator loading module 710. The illustration includes a time progression versus fan speed. The fan speed may be any fan output parameter. At a time 1108, the cooling fan commands 734 increase simultaneously for three cooling fans. The alternator loading module 710 provides an adjusted fan command 1102 for the first fan that allows the increase with the first fan, and waits a fan increase speed time window 730 before providing the adjusted fan command 1104 allowing an increase for the second fan. Further, the alternator loading module 710 waits an additional fan increase speed time window 730 before providing the adjusted fan command 1106 allowing an increase for the third fan. At a time 1110, another cooling fan command 734 increase is provided simultaneously for the three cooling fans, and the alternator loading module 710 provides a similar response for the adjusted fan commands 1102, 1104, 1106.

At a time 1112, the cooling fan command 734 provides a fan output decrease for all three fans simultaneously. The alternator loading module 710 again provides the adjusted fan commands 1102, 1104, 1106. The adjusted fan commands 1102, 1104, 1106 are provided in reverse order, i.e. dropping the adjusted fan command 1106 for the third fan first. Additionally, the alternator loading module 710 delays for the fan decrease speed time window 732 before allowing the next fan output to decrease. At time 1114, a system shutdown occurs, and the alternator loading module 710 allows all of the fans to immediately shut down. The operations described in the illustrated fan ramping logic 1200 are exemplary only, and the axes for time and fan speed (or output) are not shown to scale.

An exemplary procedure for controlling genset cooling is described. Operations described are understood to be exemplary only, and operations may be combined or divided, and added or removed, as well as re-ordered in whole or part, unless stated explicitly to the contrary herein. Certain operations described may be implemented by a computer executing a computer program product on a computer readable medium, where the computer program product comprises instructions causing the computer to execute one or more of the operations, or to issue commands to other devices to execute one or more of the operations An exemplary procedure includes an operation to interface a genset harness and a genset controller, and in response to the interfacing, an operation to interpret a genset identification parameter. The procedure further includes an operation to select a cooling algorithm from a predetermined set of cooling algorithms in response to the genset identification parameter, an operation to interpret interpreting at least one genset operating condition in response to the cooling algorithm, and an operation to control a variable speed fan in response to the cooling algorithm and the at least one genset operating condition. The exemplary procedure further includes operating the variable speed fan in response to a control box temperature, an engine coolant temperature, and/or an engine intake manifold temperature.

An exemplary procedure includes an operation to interpret the genset operating conditions by determining an engine coolant temperature and a control box temperature and operating the variable speed fan by looking up a first speed for the variable speed fan as a function of the engine coolant temperature, looking up a second speed for the variable speed fan as a function of the control box temperature, selecting a maximum speed of the first speed and the second speed, and controlling the variable speed fan to the maximum speed. Additional embodiments include an operation to determine a maximum allowable fan speed for the variable speed fan according to an audible noise limit for the genset, and to operate the variable speed fan further in response to the maximum allowable fan speed.

An exemplary procedure further includes operating a number of variable speed fans in response to the cooling algorithm. A further procedure includes operating a first and second variable speed fan in response to a coolant temperature of an engine and a control box temperature, operating the first and second variable speed fans such that only one of the variable speed fans experiences a fan speed increase within a predetermined fan increase speed time window, and/or operating the first and second variable speed fans such that only one of the variable speed fans experiences a fan speed decrease within a predetermined fan decrease speed time window. A further exemplary procedure includes operating a third variable speed fan in response to the coolant temperature of the engine and an intake manifold temperature, and operating a fourth variable speed fan in response to the control box temperature and the intake manifold temperature.

Many different inventive embodiments of the present application are envisioned. Further written descriptions of the various inventions of the present application include without limitation the following:

A first set of embodiments include gensets including acoustic signature reduction, such as a genset apparatus comprising: an electric power generator; an engine mechanically coupled to the generator to provide mechanical power thereto; a housing assembly defining an interior space to at least partially enclose the engine and the electric power generator, the housing assembly including a unique door and sealing arrangement to reduce acoustic signature and/or electromagnetic interference.

In various more detailed inventions based on this invention: the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A second set of embodiments include gensets including various cooling fan features, such as a genset apparatus, comprising: an electric power generator; an engine mechanically coupled to the generator to provide mechanical power thereto; a housing assembly defining an interior space to at least partially enclose the engine and the electric power generator, the housing assembly including an air intake conduit to receive cooling air exterior to the housing; a cooling fan coupled to the housing, the cooling fan including a fan intake opposite a fan discharge, the fan intake being structured to receive the cooling air through the intake conduit for discharge into the interior of the enclosure through the fan discharge to cool the engine and the generator.

In various more detailed inventions based on this invention: the cooling fan is of a variable speed type; the cooling air from the cooling air passageway is divided in the housing to provide a first airflow to an engine radiator and second airflow to a compartment of the housing containing the engine and the alternator; the intake conduit defines an external intake opposite the fan intake with a sidewall extending therebetween, the sidewall defining a number of apertures therethrough; and/or the intake conduit defines an approximately cylindrical sidewall extending from the fan intake to an external intake of the intake conduit.

A third set of embodiments include gensets with unique electrical power output features, such as a genset apparatus, comprising: an internal combustion engine; an electric power generator mechanically driven by the engine to provide a first AC electric power output and a second AC electric power output, the first output being provided from the generator output and the second AC electric output being drawn from a winding of the generator and means for metering the second output independent of the first output.

In various more detailed inventions based on this invention: a current transformer is provided that measures current through the winding used to provide the second AC electric output; the first output and the second output are at different AC frequencies; the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A fourth set of embodiments include gensets with performance features to accommodate environmental extremes, including, without limitation, a genset apparatus, comprising: an internal combustion engine; an electric power generator mechanically driven by the engine, and winterization equipment that provides for starting the engine in environments too cold to start without such equipment.

In various more detailed inventions based on this invention: the equipment includes a fuel-fired heater, the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A fifth set of embodiments include gensets with unique fueling features, including without limitation, a genset apparatus, comprising: an internal combustion engine; an electric power generator mechanically driven by the engine, and a fueling assembly including a fuel reservoir, a first pump to provide pressurized fuel to the engine from the reservoir, a fuel sensor to measure fuel level in the reservoir, and a second pump to provide fuel to the reservoir from a fuel supply.

In various more detailed inventions based on this invention: the fuel assembly is provided as an integrated unit, the fuel supply is external to the genset, the fuel supply include an external tank, the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A sixth set of embodiments includes gensets with unique communication interfaces, including without limitation, a genset apparatus, comprising: an internal combustion engine; an electric power generator mechanically driven by the engine, and a USB port to provide mass storage and our communication of maintenance information, other types of information, and/or to facilitate communication.

In various more detailed inventions based on this invention: the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A seventh set of embodiments include gensets with unique maintenance aspects, including without limitation, a genset apparatus, comprising: an internal combustion engine; an electric power generator mechanically driven by the engine, and a maintenance display and interface module including: operating logic in the form of software, firmware, a dedicated hardwired state machine, or a combination of these to: automatically prompt generator set operators to perform periodic/scheduled maintenance items and allow them to annotate maintenance actions without the use of a computer keyboard or special computer software—in particular, these capabilities are provided via a small operator panel display mounted on the generator set; provide multiple options for maintenance actions including: complete, defer, dismiss; detect engine/model type and automatically configure maintenance items and maintenance intervals unique to the same; allow the user to navigate through all active maintenance items from the operator panel display; provide a generator warning fault on the generator-set mounted display to alert the user that he/she has an active maintenance item that requires their attention; and/or generate a maintenance log file entry for each active maintenance item, wherein the entry includes one or more of a time/date stamp and a generator set operating parameter, further wherein the operating parameter includes one or more of: voltage, current, power, engine hours, engine protection data, cooling fan status, cold-weather starting aids status, ambient temperature, and/or another parameter needed for diagnostic purposes.

In various more detailed inventions based on this invention: nonvolatile maintenance log data is available via a USB port and/or is a comma-separated variable (CSV) file format; the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

An eighth set of embodiments include gensets with a variable speed cooling fan, including without limitation, a genset apparatus, comprising: an internal combustion engine; an electric power generator mechanically driven by the engine, a housing at least partially enclosing the engine and the generator, one or more sensors, and a variable speed fan to draw cooling air into the housing and control cooling air flow through the housing in response to the one or more sensors.

In various more detailed inventions based on this invention: the one or more sensors include at least one of CAC temperature sensor, coolant top tank temperature sensor, and fuel return temperature sensor; the apparatus includes a controller and the one or more sensors include at least two of: a CAC temperature sensor, a coolant top tank temperature sensor, and a fuel return temperature sensor, and the controller executes operating logic to maintain the temperature from each of the one or more sensors within a predefined temperature range; the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A ninth set of embodiments include gensets with a variable speed cooling fan, including without limitation, a genset apparatus, comprising: an internal combustion engine; an electric power generator mechanically driven by the engine, and a housing at least partially enclosing the engine and the generator, the housing defining multiple compartments in fluid communication with a cooling air intake to draw cooling air into the housing, a first one of the compartments containing a radiator to cool the engine and a second one of the compartments containing at least one of the engine and the generator, the housing being structure to define a first airflow through the first one of the compartments to cool the radiator and a second air flow through a second one of the compartments to cool at least one of the engine and the generator. In various more detailed inventions based on this invention: one of the compartments includes at least one of a CAC and a fuel cooler, the housing defines a first compartment housing a radiator and a second compartment housing at least one of the engine and the generator; means for directing cooling air into a first compartment housing a radiator and a second compartment housing at least one of the engine and the generator; the housing defines a first compartment housing a radiator that includes a first outlet to discharge a radiator cooling airflow away from the housing and a second compartment housing at least one of the engine and the generator that includes a second outlet to discharge another cooling airflow away from the housing; a variable speed fan is also included to draw cooling air into the housing; a fan is included to draw cooling air into a first compartment of the housing that contains a radiator for the engine, the housing further including a second compartment in fluid communication with the first compartment that contains at least one of the engine and the generator, the housing being structured to form a first airflow to cool the radiator that exits through a first housing discharge and a second airflow that is directed into the second compartment and exits through a second housing discharge; and/or the housing includes an intake conduit connected to a fan to draw cooling air into the housing, the intake conduit including an approximately cylindrical sidewall defining a number of apertures therethrough.

A tenth set of embodiments include gensets with a variable speed cooling fan, including without limitation, a genset apparatus, comprising: an internal combustion engine; an electric power generator mechanically driven by the engine, a housing at least partially enclosing the engine and the generator, and a transfer switch coupled to the housing.

Another exemplary set of embodiments includes a system having a genset. The genset includes an engine, an AC generator, and a radiator thermally coupled to the engine. The genset further includes one or more electric variable speed fans having an outlet flow, where at least a portion of the outlet flow of one of the fans passes through the radiator. The system further includes a controller having a number of modules structured to functionally execute certain operations for cooling the genset. The exemplary controller includes a genset identification module, a cooling fan logic module, an operation conditions module, a cooling fan command module, and an alternator loading module.

The genset identification module interprets a genset identification parameter, and the cooling fan logic module selects a cooling algorithm from a predetermined set of cooling algorithms in response to the genset identification parameter. The operation conditions module interprets a genset operating condition(s) in response to the selected cooling algorithm. The cooling fan command module provides a cooling fan command in response to the selected cooling algorithm and to the genset operating condition(s). The electric variable speed fans are responsive to the cooling fan command.

In various more detailed inventions based on this invention: the genset parameter includes a genset frequency and a genset power rating; the genset identification parameter includes a genset model number; the predetermined set of cooling algorithms includes a number of genset identification parameter values, each of the genset identification parameter values corresponding to lookup table(s), where each lookup table includes a cooling fan output value as a function of a genset operating condition. Additional embodiments include: the genset operating condition being a temperature of a control box, a coolant temperature, a genset compartment temperature, and/or an intake manifold temperature; and the selected cooling algorithm including a number of lookup tables, where the cooling fan command module further provides the cooling fan command as a greatest cooling fan output value from the number of lookup tables. Additional embodiments further include the cooling algorithm having a maximum allowable fan speed, and the cooling fan command module further commands the variable speed fan at the maximum allowable fan speed in response to the genset operating condition being unavailable and/or in a fault condition.

Additional embodiments of the system include a number of variable speed fans, where the cooling fan command module further provides a cooling fan command for each of the variable speed fans in response to the selected cooling algorithm and the genset operating condition. In certain embodiments, the alternator loading module adjusts the cooling fan commands such that only one of the variable speed fans experiences a fan speed increase within a predetermined fan increase speed time window, and/or such that only one of the variable speed fans experiences a fan speed decrease within a predetermined fan decrease speed time window.

An exemplary embodiment further includes the system having three variable speed fans, where the cooling algorithm includes controlling the first variable speed fan and the second variable speed fan as a first function of a coolant temperature of the engine and as a function of a control box temperature, and where the cooling algorithm further includes controlling the third variable speed fan as a second function of the coolant temperature of the engine and as a function of an intake manifold temperature.

Another exemplary embodiment includes the system having four variable speed fans, where the cooling algorithm includes controlling the first variable speed fan and the second variable speed fan as a first function of a coolant temperature of the engine and as a function of a control box temperature, where the cooling algorithm further includes controlling the third variable speed fan as a second function of the coolant temperature of the engine and as a first function of an intake manifold temperature, and where the cooling algorithm further includes controlling the fourth variable speed fan as the function of the control box temperature and as a second function of the intake manifold temperature of the engine.

Another exemplary embodiment includes the system having three variable speed fans, where the cooling algorithm includes controlling each of the variable speed fans as a function of a coolant temperature of the engine, as a function of a control box temperature, and as a function of the intake manifold temperature of the engine.

Another exemplary set of embodiments includes a method, where the method includes the operations of interfacing a genset harness and a genset controller, and in response to the interfacing, interpreting a genset identification parameter. The method further includes selecting a cooling algorithm from a predetermined set of cooling algorithms in response to the genset identification parameter, interpreting at least one genset operating condition in response to the cooling algorithm, and operating a variable speed fan in response to the cooling algorithm and the at least one genset operating condition.

In various more detailed inventions based on this invention: the method includes operating the variable speed fan in response to a control box temperature, an engine coolant temperature, and/or an engine intake manifold temperature; interpreting the genset operating conditions by determining an engine coolant temperature and a control box temperature and operating the variable speed fan by looking up a first speed for the variable speed fan as a function of the engine coolant temperature, looking up a second speed for the variable speed fan as a function of the control box temperature, selecting a maximum speed of the first speed and the second speed, and controlling the variable speed fan to the maximum speed. Additional embodiments include determining a maximum allowable fan speed for the variable speed fan according to an audible noise limit for the genset, and operating the variable speed fan further in response to the maximum allowable fan speed.

Additional embodiments include operating a number of variable speed fans in response to the cooling algorithm. An exemplary method includes operating a first and second variable speed fan in response to a coolant temperature of an engine and a control box temperature; operating the first and second variable speed fans such that only one of the variable speed fans experiences a fan speed increase within a predetermined fan increase speed time window; operating the first and second variable speed fans such that only one of the variable speed fans experiences a fan speed decrease within a predetermined fan decrease speed time window; operating a third variable speed fan in response to the coolant temperature of the engine and an intake manifold temperature; and operating a fourth variable speed fan in response to the control box temperature and the intake manifold temperature.

Another exemplary set of embodiments includes an apparatus for controlling a cooling system of a genset. The apparatus includes a genset identification module that interprets a genset identification parameter, a cooling fan logic module that selects a cooling algorithm from a predetermined set of cooling algorithms in response to the genset identification parameter, an operation conditions module that interprets at least one genset operating condition in response to the selected cooling algorithm, and a cooling fan command module that provides a cooling fan command for a variable speed fan in response to the selected cooling algorithm and the at least one genset operating condition.

In various more detailed inventions based on this invention: the predetermined set of cooling algorithms includes a number of genset identification parameter values, each of the genset identification parameter values corresponding lookup table(s), wherein each lookup table includes a cooling fan output value as a function of a genset operating condition; each genset operating condition including a temperature of a control box, a coolant temperature, a genset compartment temperature, and/or an intake manifold temperature; the selected cooling algorithm including a number of lookup tables, wherein the cooling fan command module provides the cooling fan command as a greatest cooling fan output value from the number of lookup tables; and/or the cooling algorithm further including a maximum allowable fan speed, where the cooling fan command module further provides the cooling fan command at the maximum allowable fan speed in response to the genset operating condition being unavailable and/or in a fault condition.

Certain further embodiments include: the cooling fan command module further providing a cooling fan command for each of a number of variable speed fans in response to the selected cooling algorithm and the genset operating condition; an alternator loading module that adjusts the cooling fan commands such that only one of the variable speed fans experiences a fan speed increase within a predetermined fan increase speed time window; and/or where the cooling algorithm includes controlling the first variable speed fan and the second variable speed fan as a first function of a coolant temperature of the engine and as a function of a control box temperature, and where the cooling algorithm further includes controlling the third variable speed fan as a second function of the coolant temperature of the engine and as a function of an intake manifold temperature.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A system, comprising:
a genset including an engine, an AC generator operably connected to the engine, and a radiator coupled to the engine to receive heat from at least the engine;
an electric variable speed fan having an outlet flow, wherein at least a portion of the outlet flow passes through the radiator;
a programmable controller connected to the genset and the electric variable speed fan, the controller comprising:
a genset identification module configured to interpret a genset identification parameter value of the genset from a plurality of genset identification parameter values;
a cooling fan logic module configured to select a cooling algorithm in response to the genset identification parameter value from a predetermined set of cooling algorithms stored in a memory of the controller that are associated with respective ones of the plurality of genset identification parameter values;
an operation conditions module configured to interpret at least one genset operating condition of the genset to implement the selected cooling algorithm;
a cooling fan command module configured to provide a cooling fan command in response to the selected cooling algorithm and the at least one genset operating condition; and
wherein the electric variable speed fan is responsive to the cooling fan command to provide the outlet flow.

2. The system of claim 1, wherein the genset identification parameter values comprise a genset frequency and a genset power rating.

3. The system of claim 1, wherein the genset identification parameter values comprise a genset model number.

4. The system of claim 1, wherein each of the genset identification parameter values corresponding to at least one lookup table, wherein each of the at least one lookup tables comprises a cooling fan output value as a function of the at least one genset operating condition.

5. The system of claim 4, wherein the at least one genset operating condition is selected from the conditions consisting of: a temperature of a control box, a coolant temperature, a genset compartment temperature, and an intake manifold temperature.

6. The system of claim 4, wherein the cooling fan command module is further configured to provide the cooling fan command as a greatest cooling fan output value from a plurality of lookup tables associated with the selected cooling algorithm.

7. The system of claim 1, further comprising a plurality of variable speed fans, and wherein the cooling fan command module is further configured to provide a cooling fan command for each of the variable speed fans in response to the selected cooling algorithm and the genset operating condition.

8. The system of claim 7, wherein the controller further comprises an alternator loading module configured to adjust the cooling fan commands such that only one of the variable speed fans experiences a fan speed increase within a predetermined fan increase speed time window.

9. The system of claim 7, wherein the controller further comprises an alternator loading module configured to adjust the cooling fan commands such that only one of the variable speed fans experiences a fan speed decrease within a predetermined fan decrease speed time window.

10. The system of claim 7, further comprising three variable speed fans, wherein the controller is configured to control the first variable speed fan and the second variable speed fan as a first function of a coolant temperature of the engine and as a function of a control box temperature in response to the selected cooling algorithm, and wherein the controller is further configured to control the third variable speed fan as a second function of the coolant temperature of the engine and as a function of an intake manifold temperature in response to the selected cooling algorithm.

11. The system of claim 7, further comprising four variable speed fans, wherein the controller is configured to control the first variable speed fan and the second variable speed fan as a first function of a coolant temperature of the engine and as a function of a control box temperature in response to the selected cooling algorithm, wherein the controller is further configured to control the third variable speed fan as a second function of the coolant temperature of the engine and as a first function of an intake manifold temperature in response to the selected cooling algorithm, and wherein the controller is further configured to control the fourth variable speed fan as the function of the control box temperature and as a second function of the intake manifold temperature of the engine in response to the selected cooling algorithm.

12. The system of claim 7, further comprising three variable speed fans, wherein the controller is configured to control each of the variable speed fans as a function of a coolant temperature of the engine, as a function of a control box temperature, and as a function of the intake manifold temperature of the engine in response to the selected cooling algorithm.

13. The system of claim 1, wherein the cooling fan command module is further configured to command the variable speed fan at a maximum allowable fan speed in response to the selected cooling algorithm and further in response to the genset operating condition being one of unavailable and in a fault condition.

14. A method, comprising:
interfacing a genset harness and a genset controller;
in response to the interfacing, interpreting a genset identification parameter with the genset controller, wherein the genset identification parameter identifies a genset associated with the genset harness;

selecting a cooling algorithm from a predetermined set of cooling algorithms stored in a memory of the genset controller in response to the genset identification parameter;

interpreting at least one genset operating condition of the genset in response to the selected cooling algorithm; and operating a variable speed fan with the genset controller in response to the selected cooling algorithm and the at least one genset operating condition.

15. The method of claim 14, further comprising operating the variable speed fan in response to at least one temperature selected from the temperatures consisting of a control box temperature, an engine coolant temperature, and an engine intake manifold temperature.

16. The method of claim 14, wherein the interpreting at least one genset operating condition comprises determining an engine coolant temperature and a control box temperature, and wherein the operating the variable speed fan comprises looking up a first speed for the variable speed fan as a function of the engine coolant temperature, looking up a second speed for the variable speed fan as a function of the control box temperature, selecting a maximum speed of the first speed and the second speed, and wherein the operating the variable speed fan comprises controlling the variable speed fan to the maximum speed.

17. The method of claim 16, further comprising determining a maximum allowable fan speed for the variable speed fan according to an audible noise limit for the genset, and wherein the operating the variable speed fan is further in response to the maximum allowable fan speed.

18. The method of claim 14, further comprising operating a plurality of variable speed fans in response to the cooling algorithm.

19. The method of claim 18, further comprising operating a first and second variable speed fan in response to a coolant temperature of an engine and a control box temperature.

20. The method of claim 19, further comprising operating the first and second variable speed fans such that only one of the variable speed fans experiences a fan speed increase within a predetermined fan increase speed time window.

21. The method of claim 20, further comprising operating the first and second variable speed fans such that only one of the variable speed fans experiences a fan speed decrease within a predetermined fan decrease speed time window.

22. The method of claim 19, further comprising operating a third variable speed fan in response to the coolant temperature of the engine and an intake manifold temperature.

23. The method of claim 22, further comprising operating a fourth variable speed fan in response to the control box temperature and the intake manifold temperature.

24. An apparatus, comprising:
a programmable controller including:
a genset identification module configured to interpret a genset identification parameter value of a genset associated with the controller from a plurality of genset identification parameter values;

a cooling fan logic module configured to select a cooling algorithm in response to the genset identification parameter value from a predetermined set of cooling algorithms stored in a memory of the controller that are associated with respective ones of the plurality of genset identification parameter values;

an operation conditions module configured to interpret at least one genset operating condition of the genset to implement the selected cooling algorithm; and a cooling fan command module configured to provide a cooling fan command for a variable speed fan of the genset in response to the selected cooling algorithm and the at least one genset operating condition.

25. The apparatus of claim 24, wherein the predetermined set of cooling algorithms comprises a plurality of genset identification parameter values, each of the genset identification parameter values corresponding to at least one lookup table, wherein each of the at least one lookup tables comprises a cooling fan output value as a function of a genset operating condition.

26. The apparatus of claim 25, wherein each genset operating condition comprises a genset operating condition selected from the conditions consisting of: a temperature of a control box, a coolant temperature, a genset compartment temperature, and an intake manifold temperature.

27. The apparatus of claim 25, wherein the cooling fan command module is further configured to provide the cooling fan command as a greatest cooling fan output value from a plurality of lookup tables associated with the selected cooling algorithm.

28. The apparatus of claim 27, wherein the cooling fan command module is further configured to provide the cooling fan command at the maximum allowable fan speed in response to the selected cooling algorithm and further in response to the genset operating condition being one of unavailable and in a fault condition.

29. The apparatus of claim 24, wherein the cooling fan command module is further configured to provide a cooling fan command for each of a number of variable speed fans of the genset in response to the selected cooling algorithm and the genset operating condition.

30. The apparatus of claim 29, wherein the controller further includes an alternator loading module configured to adjust the cooling fan commands such that only one of the variable speed fans experiences a fan speed increase within a predetermined fan increase speed time window.

31. The apparatus of claim 30, wherein the controller is configured to control a first variable speed fan and a second variable speed fan as a first function of a coolant temperature of the engine and as a function of a control box temperature in response to the selected cooling algorithm, and wherein the controller is further configured to control a third variable speed fan as a second function of the coolant temperature of the engine and as a function of an intake manifold temperature in response to the selected cooling algorithm.

* * * * *